United States Patent
Wei et al.

(10) Patent No.: US 8,213,157 B2
(45) Date of Patent: Jul. 3, 2012

(54) SINGLE-WALL CARBON NANOTUBE SUPERCAPACITOR

(75) Inventors: Bingqing Wei, Newark, DE (US); Charan Masarapu, Fremont, CA (US)

(73) Assignee: University of Delaware, Newark, DE (US)

( * ) Notice: Subject to any disclaimer, the term of this patent is extended or adjusted under 35 U.S.C. 154(b) by 242 days.

(21) Appl. No.: 12/762,788

(22) Filed: Apr. 19, 2010

(65) Prior Publication Data

US 2011/0026189 A1 Feb. 3, 2011

Related U.S. Application Data

(60) Provisional application No. 61/170,335, filed on Apr. 17, 2009, provisional application No. 61/174,752, filed on May 1, 2009.

(51) Int. Cl.
*H01G 9/00* (2006.01)

(52) U.S. Cl. ........ 361/502; 361/503; 361/504; 361/512; 361/517; 361/519

(58) Field of Classification Search .................. 361/502, 361/503–504, 509–519, 523–525, 528–529; 29/25.01, 25.03

See application file for complete search history.

(56) References Cited

U.S. PATENT DOCUMENTS

| | | | |
|---|---|---|---|
| 5,973,913 A | 10/1999 | McEwen et al. | |
| 6,414,837 B1 | 7/2002 | Sato et al. | |
| 6,522,522 B2 * | 2/2003 | Yu et al. | 361/502 |
| 6,671,166 B1 | 12/2003 | Penneau et al. | |
| 6,778,379 B2 * | 8/2004 | Iwaida et al. | 361/502 |
| 7,061,749 B2 * | 6/2006 | Liu et al. | 361/502 |
| 7,410,729 B2 | 8/2008 | Takahashi | |
| 7,430,108 B2 | 9/2008 | Ozawa et al. | |
| 7,553,341 B2 * | 6/2009 | Pan et al. | 29/25.03 |
| 7,924,548 B2 * | 4/2011 | Yamada et al. | 361/502 |

OTHER PUBLICATIONS

An, et al., Kay Hyeok, "Electrochemical Properties of High-Power Supercapacitors Using Single-Walled Carbon Nanotube Electodes," *Adv. Funct. Mater.*, 11(5):387-392, Oct. 2001.
Barisci, et al., Joseph N., "Electrochemical Studies of Single-Wall Carbon Nanotubes in Aqueous Solutions," *J. Electrochem. Soc.*, 488, 92-98, 2000.
Barisci, et al., Joseph N., "Electrochemical Properties of Single-Wall Carbon Nanotube Electrodes," *J. Electrochem. Soc.*, 150(9) E409-E415, 2003.
Baughman, et al., Ray H., "Carbon Nanotube Actuators," *Science*, vol. 284; 1340-1344, May 21, 1999.
Burke, Andrew, "R&D Considerations for the Performance and Application of Electrochemical Capacitors," *Electrochimica Acta*, 53, 1083-1091, 2007.
Chmiola, et al., J., "Anomalous Increase in Carbon Capacitance at Pore Sizes Less Than 1 Nanometer," *Science*, vol. 313, 1760-1763, Sep. 22, 2006.

(Continued)

*Primary Examiner* — Nguyen T Ha
(74) *Attorney, Agent, or Firm* — RatnerPrestia

(57) ABSTRACT

A supercapacitor comprising a cathode, an anode, a first single-walled carbon nanotube (SWNT) film electrode adjacent the cathode, a second SWNT film electrode adjacent the anode, and separator disposed between the first and second electrodes. The SWNT film electrodes may be manufactured by a non-filtration process comprising depositing the SWNT film on a foil via CVD; separating the SWNT film from the foil; heating the SWNT film; treating the SWNT film with an acid solution; washing the SWNT film; and excising the electrodes from the SWNT film.

20 Claims, 5 Drawing Sheets

OTHER PUBLICATIONS

Conway, et al., B. E., "Double-layer and Pseudocapacitance Types of Electrochemical Capacitors and Their Applications to the Development of Hybrid Devices," *J. Solid State Electrochem.*, 7:637-644, 2003.

Dalton, et al., Alan B., "Super-tough Carbon-nanotube Fibres," *Nature*, vol. 423, pp. 703, Jun. 12, 2003.

Frackowiak, et al., E., "Nanotubular Materials for Supercapacitors," *Journal of Power Sources*, 97-98; 822-825, 2001.

Frackowiak, Elzbieta, "Carbon Materials for Supercapacitor Application," *Phys. Chem. Chem. Phys.*, vol. 9, 1774-1785, 2007.

Futaba, et al., Don N., "Shape-engineerable and Highly Densely Packed Single-walled Carbon Nanotubes and Their Application as Super-capacitor Electrodes," *Nature Materials*, vol. 5, 987-994, Dec. 2006.

Hahn, et al., M., "Gas Evolution in Activated Carbon/Propylene Carbonate Based Double-layer Capacitors," *Electrochemistry Communications*, 7, 925-930, 2005.

Hahn, et al., M., "Pressure Evolution in Propylene Carbonate Based Electrochemical Double Layer Capacitors," *Electrochimica Acta*, 52:1709-1712, 2006.

Hung, et al., Kaihsuan, "Wide-temperature Range Operation Supercapacitors from Nanostructured Activated Carbon Fabric," *Journal of Power Sources*, 2009, doi:10.1016/j.jpowsour.2009.01.083.

Kötz, et al., R., "Principles and Applications of Electrochemical Capacitors," *Electrochimica Acta*, 45:2483-2498, 2000.

Kötz, et al., R., "Temperature Behavior and Impedance Fundamentals of Supercapacitors," *Journal of Power Sources*, 154:550-555, 2006.

Kurzweil, et al., P., "Electrochemical Stability of Organic Electrolytes in Supercapacitors: Spectroscopy and Gas Analysis of Decomposition Products," *Journal of Power Sources*, 176:555-567 2006.

Li, et al., X.H., "Thermal Decomposition Characteristics of Poly(Propylene Carbonate) using TG/IR and Py-GC/MS techniques," *Polymer Degradation and Stability* 81:157-165, 2003.

Liu, et al., Ping, "Influence of Temperature and Electrolyte on the Performance of Activated-carbon Supercapacitors," *Journal of Power Sources*, 156:712-718, 2006.

MacNeil, et al., D. D., "Can an Electrolyte for Lithium-Ion Batteries Be Too Stable?" *Journal of the Electrochemical Society*, 150(1):A21-A28, 2003.

Masarapu, et al., Charan, "Effect of Temperature on the Capacitance of Carbon Nanotube Supercapacitors," *American Chemical Society*, vol. 3, No. 8, pp. 2199-2206, 2009.

Miller, et al., John R., "Electrochemical Capacitors for Energy Management," *Science*, vol. 321, pp. 651-652, Aug. 1, 2008.

Niu, et al., Chunming, "High Power Electrochemical Capacitors Based on Carbon Nanotube Electrodes," *Appl. Phys. Lett.*, 70(11): 1480-1482, Mar. 17, 1997.

Obreja, Vasile, V.N., "On the Performance of Supercapacitors with Electrodes Based on Carbon Nanotubes and Carbon Activated Material—A review," *Physica E*, 40:2596-2605, 2008.

Peigney, et al., A., "Specific Surface Area of Carbon Nanotubes and Bundles of Carbon Nanotubes," *Carbon*, 39:507-514, 2001.

Service, Robert F., "New 'Supercapacitor' Promises to Pack More Electrical Punch," *Science* vol. 313, p. 902, Aug. 18, 2006.

Shiraishi, et al., Soshi, "Electric Double Layer Capacitance of Highly Pure Single-walled Carbon Nanotubes (HiPco™ Buckytubes™) in Propylene Carbonate Electrolytes," *Electrochemistry Communications*, 4:593-598, 2002.

Simon, et al., Patrice, "Materials for Electrochemical Capacitors," *Nature Materials*, vol. 7, pp. 845-854, Nov. 2008.

Wei, et al., B. Q., "Reliability and Current Carrying Capacity of Carbon Nanotubes," *Applied Physics Letters*, 79(8): 1172-1174, Aug. 20, 2001.

Wei, et al., B. Q., "Organized Assembly of Carbon Nanotubes," *Nature*, vol. 416: 495-496, Apr. 4, 2002.

Zhu, et al., H. W., "Direct Synthesis of Long Single-Walled Carbon," *Science*, vol. 296:884-896, May 3, 2002.

Zhu, et al., Hongwei, "Direct Fabrication of Single-Walled Carbon Nanotube Macro-Films on Flexible Substrated," *Chem. Commun.*, pp. 3042-3044, 2007.

CAP-XX, "CAP-XX Products: A Competitive Review," http://web.archive.ora/web/20080311004252/www.cap-xx.com/resources/reviews/cxx_perf.htm, 3 pages.

CAP-XX, "CAP-XX Products: A Technology Overview," http://web.archive.org/web/20080403052118/www.cap-xx.com/resources/reviews/cxx_tech.htm, 2 pages.

CAP-XX, "Product Bulletin—HW1 series—High Temperature, Single Cell Supercapacitors," 2 pages, May 2007.

CAP-XX, "Product Bulletin—HW2 series—High Temperature, Dual Cell Supercapacitors," 2 pages, May 2007.

CAP-XX, "Product Bulletin—GS1 series—Single Cell Supercapacitors," 2 pages, May 2007.

CAP-XX, "Product Bulletin—GS2 series—Dual Cell Supercapacitors," 2 pages, May 2007.

CAP-XX, "Product Bulletin—GW1 series—Single Cell Supercapacitors," 2 pages, May 2007.

CAP-XX, "Product Bulletin—GW2 series—Dual Cell Supercapacitors," 2 pages, May 2007.

CAP-XX, "Product Bulletin—HS1 series—Single Cell Supercapacitors," 2 pages, May 2007.

CAP-XX, "Product Bulletin—HS2 series—Dual Cell Supercapacitors," 2 pages, May 2007.

CAP-XX, "HS206 Supercapacitor Datasheet Rev 1.0," 11 pages, Jun. 2007.

CAP-XX, "HS209 Supercapacitor Datasheet Revision 2.0," 11 pages, Jun. 2007.

* cited by examiner

SINGLE-WALL CARBON NANOTUBE SUPERCAPACITOR

CROSS REFERENCE TO RELATED APPLICATIONS

This application claims priority to U.S. Provisional Application Ser. No. 61/170,335, filed Apr. 17, 2009, which is incorporated herein, in its entirety, by reference; and U.S. Provisional Application Ser. No. 61/174,752, filed May 1, 2009, which is incorporated herein, in its entirety, by reference.

GOVERNMENT FUNDING

This invention was made with support from the National Science Foundation under grant number 0753462. The U.S. Government may have rights in this invention.

BACKGROUND OF THE INVENTION

Supercapacitors are becoming attractive power sources in memory backup devices, electric vehicles, military weapons, space equipment and in a number of day-to-day electronic equipment. Especially for military, space and electric vehicle applications, supercapacitors with high energy and power densities that can withstand harsh temperature environments are extremely desirable. A supercapacitor design for a specific application that requires high energy density or high power density or both, requires selecting proper electrode materials and a suitable electrolyte. Interface properties of the electrode/electrolyte, such as but not limited to the interface structure, charge transfer, ion diffusion, and the like, play a vital role in governing the rate capability and specific capacitance of the supercapacitor. Cyclic voltammetry (CV) and electrochemical impedance spectroscopy (EIS) are useful techniques for characterizing such electrode/electrolyte properties in a supercapacitor assembly.

SUMMARY OF THE INVENTION

An exemplary embodiment of the present invention comprises a supercapacitor comprising a cathode, a first single-walled carbon nanotube film electrode adjacent to the cathode, a separator located adjacent to the first single-walled carbon nanotube film electrode, a second single-walled carbon nanotube film electrode adjacent to the separator and an anode adjacent to the second single-walled carbon nanotube film electrode.

The supercapacitor may be a coin cell supercapacitor or another type of supercapacitor. In some embodiments, the separator may be soaked in an organic or ionic liquid electrolyte. Exemplary organic electrolytes include but are not limited to $TEABF_4/PC$, $TEABF_4$ dissolved in acetonitrile, and lithium hexafluorophosphate dissolved in ethylene carbonate/propylene carbonate. The separator may comprise a glass microfiber, polypropylene or polyethylene.

A gasket may be used to bind the cathode, first single-walled carbon nanotube film electrode, separator, second single-walled carbon nanotube film electrode and anode together. The gasket may comprise a fluoroelastomer, such as VITON® brand, made by E.I DuPont de Nemours and Company, a fluoropolymer, such as TEFLON®, also made by DuPont, or silicone rubber. The size of the single-walled carbon nanotube film electrodes may vary. In one exemplary embodiment, however, the single-walled carbon nanotube film electrodes may measure about 1.25 cm in diameter.

Another exemplary embodiment of the present invention comprises a process for assembling a supercapacitor. This process includes positioning a separator between a cathode and an anode, positioning a first single-walled carbon nanotube film electrode between the cathode and the separator, and positioning a second single-walled carbon nanotube film electrode between anode and the separator.

In this exemplary embodiment, the process may include sealing the supercapacitor with a gasket and/or soaking the separator in an electrolyte bath. In some embodiments, the single-walled carbon nanotube film electrodes may each comprise a portion excised from a purified single-walled nanotube film.

Another exemplary embodiment of the present invention comprises a process for producing a single-walled carbon nanotube film electrode. This process includes depositing a single-walled carbon nanotube film on a foil via chemical vapor deposition, separating the single-walled carbon nanotube film from the foil, heating the single-walled carbon nanotube film, treating the single-walled carbon nanotube film with an acid solution, washing the single-walled carbon nanotube film and excising at least one electrode from the single-walled carbon nanotube film.

In some exemplary embodiments of the present invention, the heating step of the process may include heating the single-walled carbon nanotube film to 450 degrees C. for one hour. The treating step of the process may also include treating the single-walled carbon nanotube film with hydrochloric acid for 30 minutes. The washing step of the process may include washing the single-walled carbon nanotube film with distilled water. The excising step of the process may include using a punch to excise the single-walled carbon nanotube film electrodes from the single-walled carbon nanotube film. The process may also include the additional steps of placing the single-walled carbon nanotube film on a wire mesh as well as layering multiple layers of the single-walled carbon nanotube film.

DETAILED DESCRIPTION OF THE INVENTION

Figure 1:
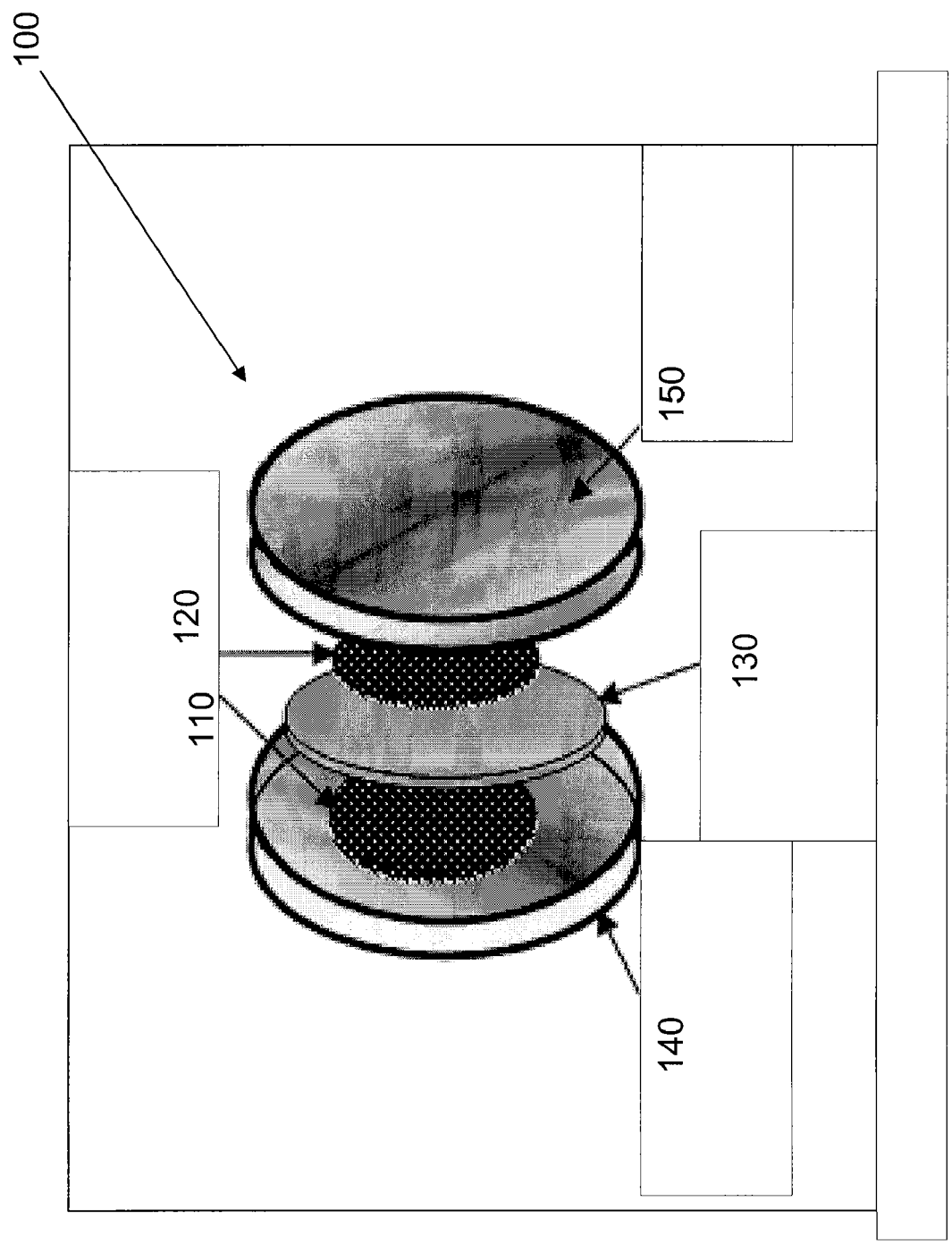
FIG. 1 illustrates a schematic representation of an exemplary supercapacitor coin cell assembly embodiment of the present invention.

Carbon nanotubes (CNTs), with their unique architecture, excellent conductivity, and high surface area, have drawn significant attraction as nanosized supercapacitor electrodes. Extremely high rate capability—the rate at which the supercapacitor can be charged and discharged—can be achieved by using CNT electrodes in supercapacitors as compared to conventional carbonaceous materials.

One embodiment of the present invention comprises a coin cell supercapacitor assembled with free standing single-walled carbon nanotube (SWNT) film electrodes and an organic electrolyte, such as tetraethylammonium tetrafluoroborate-polypropylene carbonate ($TEABF_4/PC$). Free standing SWNT film electrodes and $TEABF_4/PC$ electrolyte are capable of withstanding rigorous temperature conditions (25° C. to 100° C.). Single-walled carbon nanotubes can be synthesized as long tube structures favorable for preparing entangled mats of free standing electrodes. Electrodes made from a free standing SWNT films can be used directly without any complex nanotube coating procedures and do not require a current collector. Supercapacitors assembled with such free standing SWNT films have shown good capacitance stability, high rate capability and yielded reasonable specific capacitance values at room temperature in both aqueous and organic electrolytes.

In contrast to supercapacitors of the prior art, supercapacitors using SWNT films do not comprise current collectors. In general, most active materials used in prior art supercapacitors are available as powders, and the electrode is prepared by making slurry (mixing powder with a small amount of binder and a solvent) and coating it on a current collector such as copper or nickel or aluminum or stainless steel foil (such as is described, for example, in U.S. Pat. No. 6,946,007, incorporated herein by reference). After drying the solvent, the active material strongly adheres to the current collector and the electrode is punched from the foil for the capacitor assembly. The current collector acts as a support to hold the active material together. By contrast, a SWNT film is mechanically stable, and may be used directly as an electrode material without using a copper or nickel foil (i.e. a current collector) as a support.

One known technique for preparing a free standing SWNT film comprises dispersing nanotubes in a solution and filtering, as described, for example, by R. H. Baughman in "Carbon Nanotube Actuators," *Science* 1999, 284, 1340-1344, incorporated herein by reference. One embodiment of the present invention comprises using an electrode constructed from a free standing SWNT film directly synthesized by a chemical vapor deposition (CVD) process having post purification techniques that exclude a complex filtration step.

In one such exemplary process, a SWNT film was directly deposited on a copper foil by a CVD method, such as the method described by H. W. Zhu and B. Q. Wei in "Direct Fabrication of Single-Walled Carbon Nanotube Macro-Films on Flexible Substrates," *Chem. Commun.* 2007, 29, 3042-3044, incorporated herein by reference, using ferrocene as carbon feedstock/catalyst and sulfur as an additive to promote high percentage SWNT growth. No additional carbon source (e.g. xylene, hexane and methane) was required for synthesis. The deposited films were peeled off from the copper foil and purified by first heating in air up to 450° C. for one hour to remove amorphous carbon and then treated in 9 M HCl solution for half hour to remove iron catalyst particles. After the acid treatment, the film was thoroughly washed with DI water. At the end of the washing step, the film, which was floating on the DI water surface in a beaker, was transferred from the beaker using a wire mesh. Any material in the shape of a wire loop or mesh that can transfer the singlewall carbon nanotube film from the beaker may be used. The purification process did not involve a filtration step. The SWNTs were handled as an entire film through the entire purification process, with the complex entanglement of the long SWNT strands providing strong mechanical stability for the film. The film was then dried, and after drying the film, two 1.25 cm diameter electrodes were punched with an arch punch. The wire was then separated from the film and the film used in the capacitor assembly.

For use in a capacitor as described herein, the thickness as well as the weight of the electrodes may be controlled by varying the number of layers of the SWNT films deposited on the wire mesh. Varying the number of layers of the SWNT films used for the electrodes may be used to optimize the loading or the amount of active material in the resulting capacitor. This increase in the weight of the active materials in turn increases charge density, which increases the absolute capacitance of the capacitor.

As illustrated in FIG. 1, an exemplary supercapacitor 100 may be created by placing two SMNT film electrodes 110, 120, such as electrodes produced by one or more of the processes described or referenced herein, on either side of a separator 130. Separator 130 is soaked in an electrolyte, such as but not limited to 1M $TEABF_4$ dissolved in battery-grade polypropylene carbonate (PC) solvent, 1M $TEABF_4$ dissolved in acetonitrile 1M lithium hexafluorophosphate dissolved in ethylene carbonate/propylene carbonate (in a 1:1 ratio), or another suitable electrolyte known in the art. Separator 130 may be made of any substance including glass microfiber, polypropylene or polyethylene). Electrodes 110, 120 and separator 130 are then placed within a coin cell consisting of cathode can 140 and anode can 150. The coin cell may be sealed using a gasket (not pictured). The gasket may be made of any material known in the art, including, but not limited to a fluoropolymer such as TEFLON®, made by E.I. du Pont de Nemours and Company, silicone rubber or a fluoroelastomer, such as VITON®, made by E.I. du Pont de Nemours and Company.

Another suitable electrolyte is an ionic liquid, such as a fused molten salt with a melting point lower than or near room temperature, generally referred to as a room temperature ionic liquid. Ionic liquids have several unique physicochemical properties, such as high thermal and chemical stability, negligible vapor pressure, relatively high ionic conductivity, and wide electrochemical potential stability. The constituents of ionic liquid salts are bulky organic cations with a variety of anions. The physical properties of the ionic liquids depend on the type of the cation and anion and also on the type of the alkyl group. Acceptable ionic liquids include imidazolium, pyridinium and quaternary ammonium salts. Imidazolium salts have high ionic conductivity compared to others, and pyridinium salts have a stable wide electrochemical potential above 5V.

The electrolyte conductivity of ionic liquids greatly depends on the temperature of operation. While the conductivity is very poor at or near its solidification temperature, in the molten state, the conductivity of ionic liquid is relatively high enough to be used as an electrolyte in a supercapacitor. When non-volatile ionic liquids are used as electrolytes in a supercapacitor, the upper temperature limit for operation of the supercapacitor is determined by the salts' thermal stability provided that there are no side reactions of the electrolyte salt with the active materials. Use of non-volatile ionic liquids as electrolytes may allow an exemplary SWNT supercapacitor of the present invention to achieve consistent results well above the 100 degree Celsius threshold.

EXAMPLE

An exemplary supercapacitor was assembled in a 2032 coin cell (20 mm in diameter and has a height of 3.2 mm) with a pair of SWNT films weighing 0.7 mg each. A 1M $TEABF_4$ (Alfa Aesar) dissolved in battery-graded PC (Alfa Aesar)

solvent was used as the electrolyte. A Wattman glass microfiber filter paper soaked in the electrolyte was used as the separator. The coin cell was sealed using a TEFLON® gasket to withstand temperatures up to 150° C. The supercapacitor assembly was carried out in a glove box (MBraun, Unilab) with oxygen and water vapor levels less than 0.1 ppm. For temperature dependent measurements from 25° C. up to 100° C., described herein later, the coin cell was placed in a box oven (LINBERG/BLUE M) capable of maintaining a very stable set temperature up to one tenth of a degree Celsius.

Experimental Results

In experiments relating to aspects of the present invention, electrochemical characterization techniques, cyclic voltammetry and the electrochemical impedance spectroscopy were used to analyze the electrode/electrolyte interface properties in the supercapacitor with respect to changes in the temperature. Effects of repeated heating and cooling on the performance of the supercapacitor was studied and compared to the results of the supercapacitor with activated carbon fabric. In addition, ultra-long cycle galvanostatic charge-discharge were carried out at temperatures 25° C. and 100° C. with repeated heating and cooling to demonstrate the long term stability of the supercapacitor with the SWNT film electrodes.

The effect of temperature on the kinetics and the diffusion mechanism of the ions in a supercapacitor assembled with SWNT film electrodes and an organic electrolyte were investigated. Improved room temperature supercapacitor performance was observed, which, without limitation to any particular mechanism, is believed to be due to the combined effects of an increase in the conductivity of the SWNT films and surface modifications on the SWNT films by repeatedly heating and cooling the supercapacitor between the temperatures 25° C. and 100° C. The supercapacitor with SWNT film electrodes was capable of withstanding current densities as high as 100 A/g, yielding eminent specific power density values of about 55 kW/kg. Ultra-long galvanostatic charge-discharge cycling over 200,000 cycles with a constant current density of 20 A/g at 25° C. and at 100° C., respectively, showed excellent stability in capacitance with more than 80% efficiency. Such a supercapacitor may be ideal, for example, in back-up energy storage and high pulse power applications.

Figure 2A:
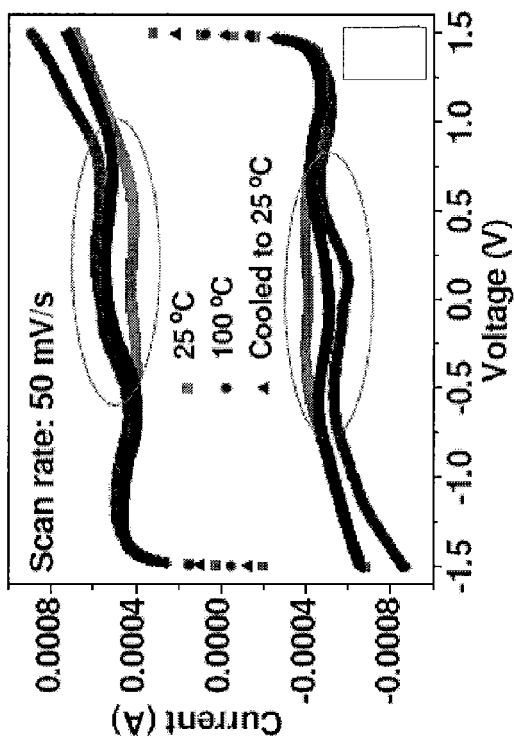
FIGS. 2A and 2B are voltammograms at scan rates of 50 mV/s and 1000 mV/s, respectively, for an exemplary supercapacitor assembly of the present invention.
Figure 2B:
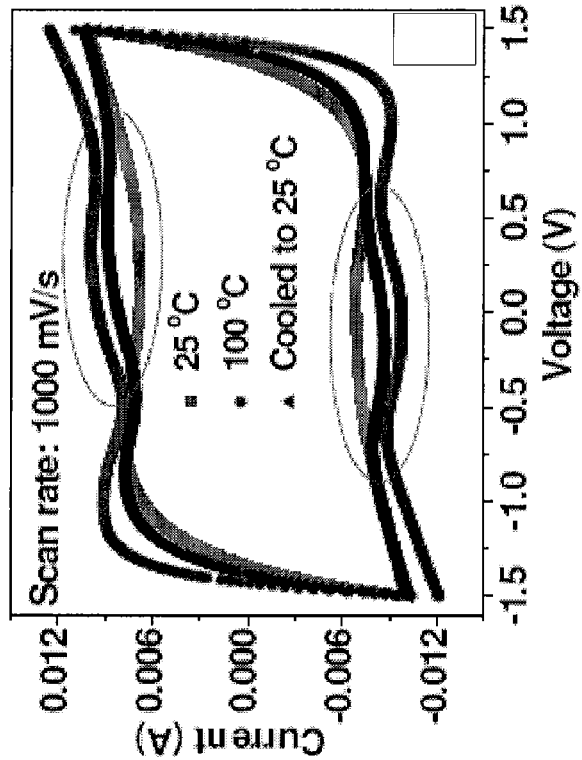

The cyclic voltammograms (CVs) of the cell were measured in the voltage window −1.5 V to +1.5 V (actual potential of operation is 1.5 V) with scan rates of 50 mV/s, 100 mV/s, 200 mV/s, 500 mV/s and 1000 mV/s at each set temperatures, 25° C., 50° C., 75° C. and 100° C. The voltammograms were close to rectangular shape at 50 mV/s as well as at a very high scan rate of 1000 mV/s, as shown in FIGS. 2A and 2B, indicating ideal capacitive behavior within this wide temperature window.

Increasing pseudocapacitive behavior in the voltammograms was observed with the increase in the temperature from 25° C. to 100° C. In fact, the capacitance at all scan rates gradually increased with the increase in temperature as shown in FIG. 2C.

Figure 2C:
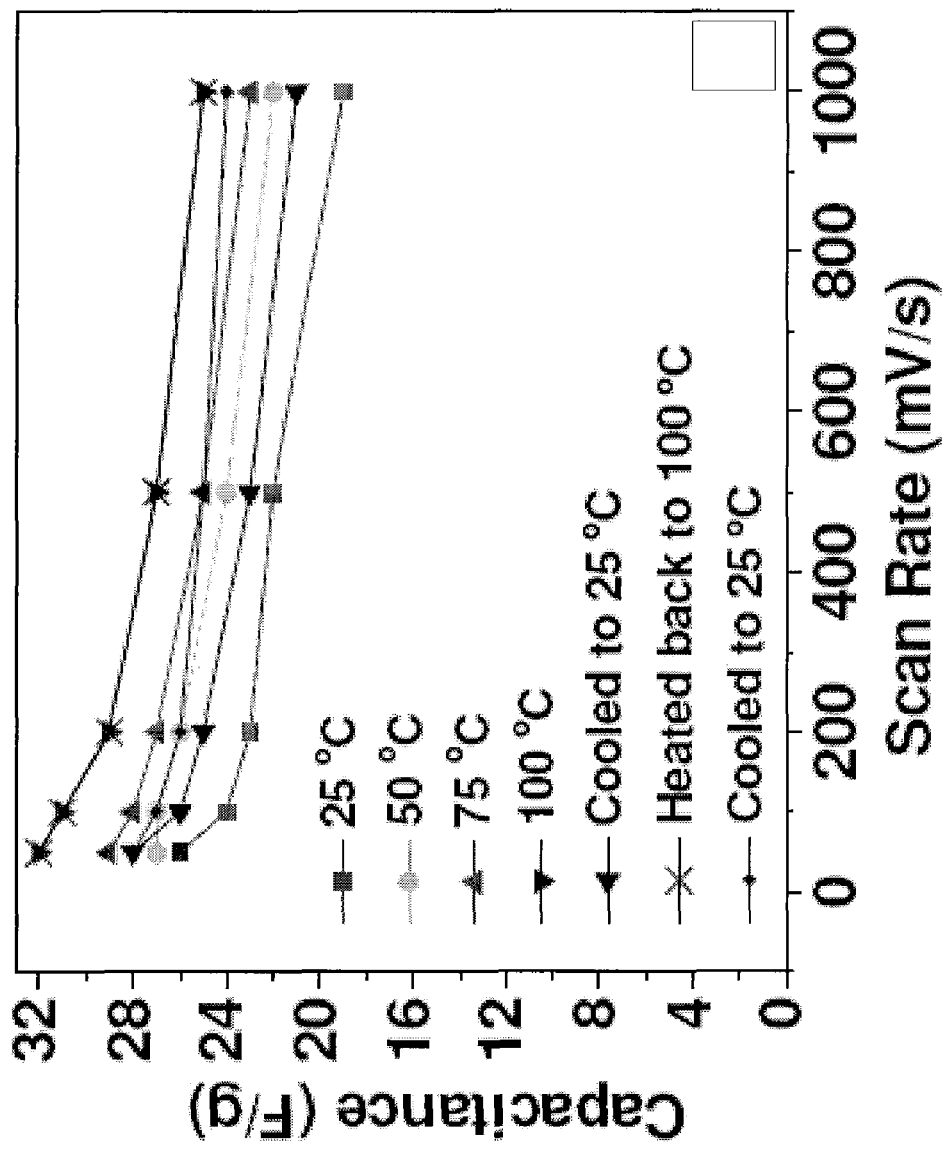
FIG. 2C is a graph of the capacitance of the cell calculated from cyclic voltammetries at different scan rates and at different temperatures versus the scan rate. Also illustrated is the capacitance of the cell with repeated heating and cooling between 25° C. and 100° C.

FIG. 2C also illustrates the performance of the cell with repeated heating and cooling. The value of the capacitance at all scan rates obtained at 25° C. after cooling back from 100° C. has a slight increase (about 10%) compared to the capacitance values obtained initially at the same temperature of 25° C. The maximum potential was limited to 1.5 V during the experiment. As the cell is heated, even though the potential is within the safe decomposition limit of the PC electrolyte, it is believed that some electrolyte evaporates and increases the vapor pressure inside the cell. The trace amount of evolved gases from the electrolyte system is believed to modify the surface of the SWNT electrode, which leads to the physisorbtion of the electrolyte ions at high temperature, giving rise to the Faradic currents in the CVs and causing an increase in the capacitance when heated from 25° C. to 100° C. It is believed that the surface modification of the SWNT films is partially irreversible and the physisorbtion remains even at 25° C. after cooling from 100° C., as evidenced by the CV curve of FIG. 2C, which shows the pseudocapacitive behavior with a capacitance value obtained at 25° C. slightly higher than the previously obtained value at the same temperature of 25° C. prior to heating. The effects of this phenomenon on the values of the capacitance can be further explained in detail by electrochemical impedance spectroscopy (EIS) measurements, as reported by the coinventors of the present invention in Charan Masarapu et al. in "Effect of Temperature on the Capacitance of Carbon Nanotube Supercapacitors," *ACS Nano*, Vol. 3, No. 8, 2199-2206 (Jul. 17, 2009), incorporated herein by reference in its entirety.

Figure 3A:
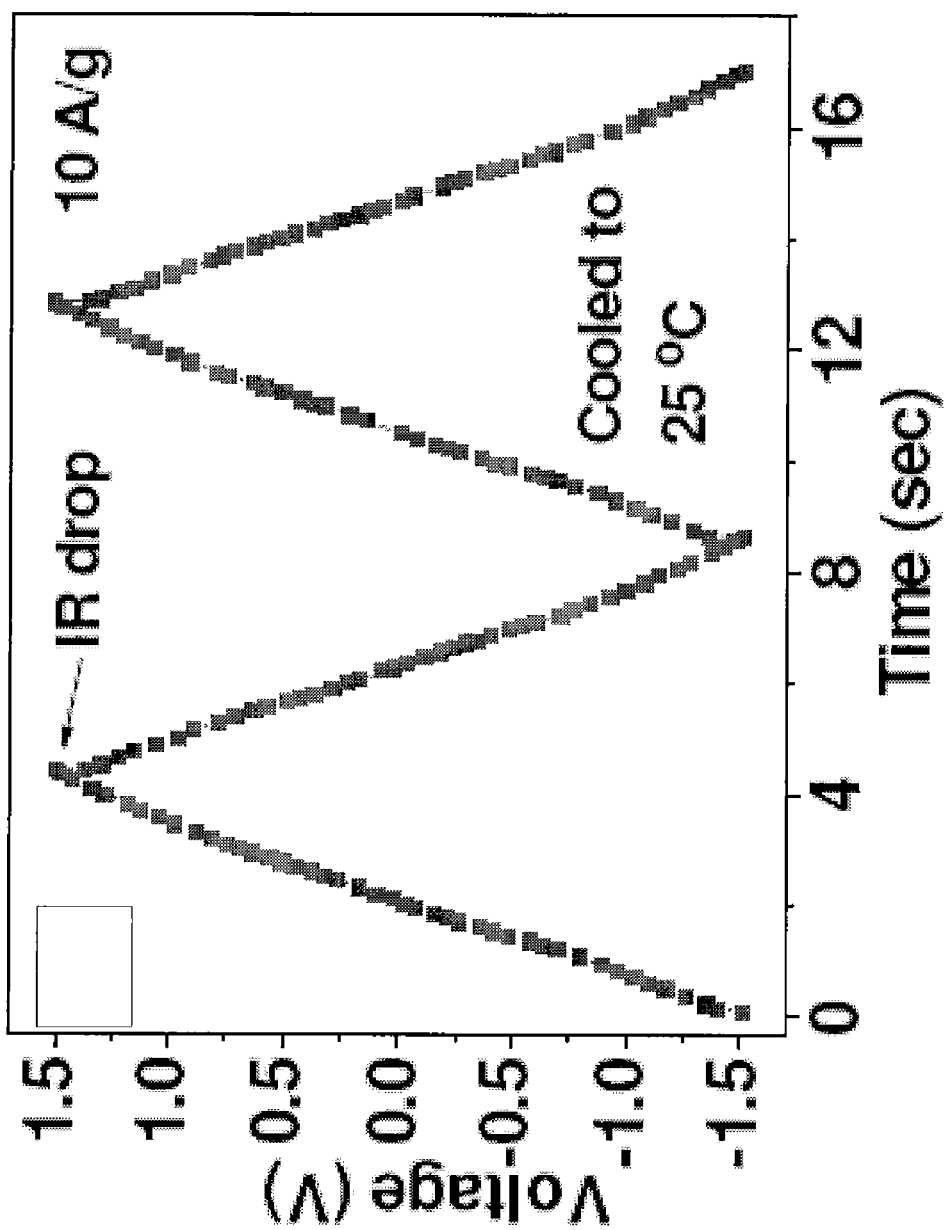
FIG. 3A is a charge-discharge curve for an exemplary supercapacitor assembly obtained at 25° C. after cooling from 100° C.
Figure 3B:
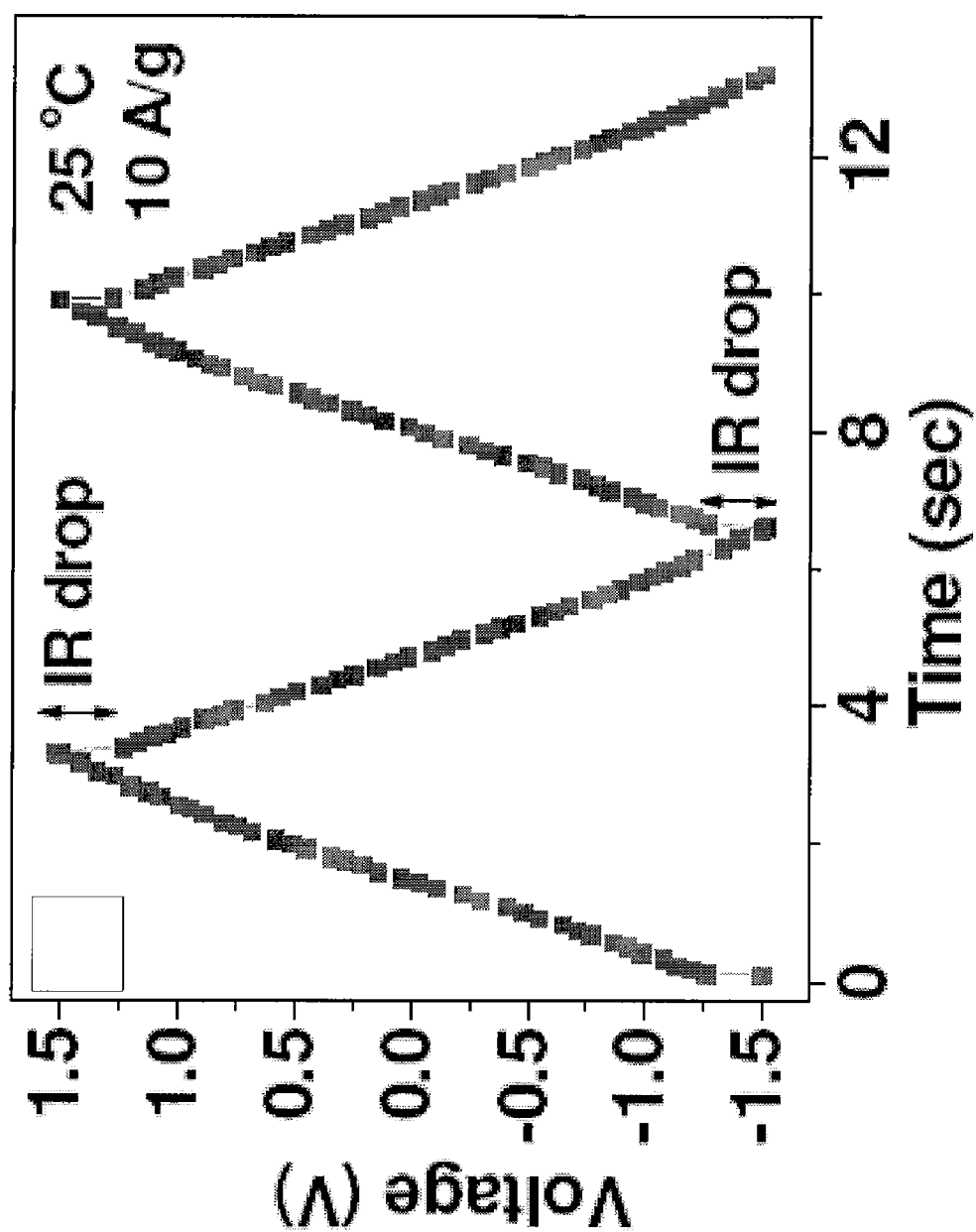
FIG. 3B is a charge-discharge curve for the same exemplary supercapacitor characterized in FIG. 3A at 25° C. prior to heating and cooling.

The improved performance at 25° C. after repeated heating and cooling observed for the supercapacitor coin cell with SWNT electrodes was not observed for a similar supercapacitor with activated carbon fabric electrodes. The improvement in the supercapacitor performance with SWNTs with repeated heating and cooling is further illustrated by plots of constant current charge-discharge cycling on the supercapacitor, which illustrate a significant reduction in the IR drop in the charge-discharge curve obtained at 25° C. after cooling from 100° C., shown in FIG. 3A, as compared to the IR drop for the as-assembled sample at 25° C. prior to heating and cooling, shown in FIG. 3B.

To demonstrate the long term stability of the supercapacitor, several tens of thousands of charge-discharge cycles were run at different constant current densities from 100 mA/g (81.46 mA/cm$^2$) to 100 A/g (81.46 A/cm$^2$), at 25° C. and at 100° C. by repeated heating and cooling. The resulting charge-discharge curves represented ideal capacitive behavior even at a current density as high as 100 A/g. As the current density was very high, large over shoots were observed in the charge-discharge curves over 1.5 V. Since the upper potential of operation for the TEABF$_4$/PC electrolyte system may be as high as 2.5 V, the overshoots did not cause any negative effects such as electrolyte decomposition or cell failure. This was shown in the long cycle performance tested by running over 10,000 charge-discharge cycles at 25° C. and 100° C. both at 50 A/g and 100 A/g. Slight changes in the slope of the charge discharge curves led to variations in the calculated capacitances at high current densities.

The total weight of the two SWNT film electrodes was considered in estimating the energy and power density. The exemplary supercapacitor had a maximum power density of about 55 kW/kg at 100° C. obtained with the discharge curve run at a constant current density of 100 A/g. The maximum energy density from a discharge curve run with 100 mA/g at 100° C. was 4.2 Wh/kg. Accordingly, the exemplary supercapacitor may be operated with a large current density tolerance in the temperature range from 25° C. to 100° C., permitting optimizing construction to obtain an optimum energy and power density for different applications.

After all the long cycle measurements at different current densities with repeated heating and cooling, the cell was run at 25° C. for 246,700 and at 100° C. for additional 224,000 charge-discharge cycles with a constant current density of 20 A/g. The cell showed excellent ultra-long cycle stability both at 25° C. and at 100° C. with an efficiency of approximately 82% and 84%, respectively. The efficiency was calculated based on the degradation in the value of discharge capacitance after all the charge-discharge cycles (246,700 cycles at 25° C. and 224,000 cycles at 100° C.) from the initial discharge capacitance obtained from the first charge-discharge cycle. Thus, the experimental results showed that the supercapacitor with free standing SWNT film electrodes in a TEABF$_4$/PC electrolyte may be conveniently operated at any current density from 100 mA/g to 100 A/g in the temperature range from 25° C. to 100° C. with no significant cell damage. Thus, exemplary supercapacitors according to the present invention have an efficiency of over 80% for over 200,000 charge-discharge cycles at 25 degrees and 100 degrees C. at current densities between 100 mA/g to 100 A/g.

Since supercapacitors are power devices, stability of their impedance during charge-discharge cycling with the repeated heating and cooling is important. Testing showed no significant increase in the impedance of the cell, even after running several thousands of charge-discharge cycles at 100° C., implying a stable power output from the supercapacitor.

There are several advantages of utilizing supercapacitor electrodes comprising free standing SWNT films synthesized from the method described herein. One advantage is that the SWNT can be handled as an entire film during the whole process of the synthesis, purification and electrode preparation, which is extremely simple compared to the filtration technique. The process can be easily expanded to acquire SWNT film electrodes with uniform thickness and on a large scale. As described herein, the film synthesis procedure is simple and it can be easily scaled up for high volume production. Complex mixing and coating procedures are not required, as they are for methods using powder samples. The SWNT film itself acts as a good conductor, thus eliminating the need for current collectors. By using the supercapacitors with the SWNT film electrodes and the TEABF$_4$/PC electrolyte, the operating temperature can be easily expanded to 100° C. with extremely high rate capability.

The present invention is not limited to supercapacitors of any particular type, shape or size. Additional exemplary embodiments of the present invention may include a capacitor assembled with two quartz slides. This exemplary embodiment comprises a capacitor created by sandwiching the capacitor assembly between the slides and then sealing the ends of the capacitor using an insulating epoxy capable of withstanding high temperatures. Further shapes, sizes and embodiments may be created as desired.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A supercapacitor comprising:
   a cathode;
   a first single-walled carbon nanotube film electrode adjacent to the cathode;
   a separator located adjacent to the first single-walled carbon nanotube film electrode;
   a second single-walled carbon nanotube film electrode adjacent to the separator; and
   an anode adjacent to said second single-walled carbon nanotube film electrode;
   wherein the supercapacitor has an efficiency of over 80% for over 200,000 charge-discharge cycles at 25 degrees and 100 degrees C. at current densities between 100 mA/g to 100 A/g.

2. The supercapacitor of claim 1, wherein the supercapacitor is a coin cell supercapacitor.

3. The supercapacitor of claim 1, wherein the separator is soaked in an organic or ionic liquid electrolyte.

4. The supercapacitor of claim 3, wherein the electrolyte is selected from the group consisting of TEABF$_4$/PC, TEABF$_4$ dissolved in acetonitrile, or lithium hexafluorophosphate dissolved in ethylene carbonate/propylene carbonate.

5. The supercapacitor of claim 1, wherein the separator comprises a material selected from the group consisting of glass microfiber, polypropylene or polyethylene.

6. The supercapacitor of claim 1, further comprising a gasket binding the cathode, first single-walled carbon nanotube film electrode, separator, second single-walled carbon nanotube film electrode and anode together.

7. The supercapacitor of claim 6, wherein the gasket comprises a material selected from the group consisting of a fluoroelastomer, silicone rubber or a fluoropolymer.

8. A process for producing a single-walled carbon nanotube film electrode, the process comprising:
   (a) depositing a single-walled carbon nanotube film on a foil via chemical vapor deposition;
   (b) separating the single-walled carbon nanotube film from the foil;
   (c) heating the single-walled carbon nanotube film;
   (d) treating the single-walled carbon nanotube film with an acid solution;
   (e) washing the single-walled carbon nanotube film;
   (f) excising at least one electrode from the single-walled carbon nanotube film.

9. A process for assembling a supercapacitor, wherein the process comprises:
   positioning a separator between a cathode and an anode;
   positioning a first single-walled carbon nanotube film electrode between the cathode and the separator; and
   positioning a second single-walled carbon nanotube film electrode between anode and the separator, wherein one or both of the first electrode and the second electrode are a product of the process of claim 8.

10. The process of claim 9, wherein the method further comprises sealing the supercapacitor with a gasket.

11. The process of claim 9, wherein the method further comprises soaking the separator in an electrolyte bath.

12. The process of claim 9, wherein the single-walled carbon nanotube film electrodes each comprise a portion excised from a purified single-walled nanotube film.

13. The process of claim 8, wherein step (c) comprises heating the single-walled carbon nanotube film to 450 degree C. for one hour.

14. The process of claim 8, wherein step (d) comprises treating the single-walled carbon nanotube film with hydrochloric acid for 30 minutes.

15. The process of claim 8, wherein step (e) comprises washing the single-walled carbon nanotube film with distilled water.

16. The process of claim 8, further comprising, prior to step (f), placing the single-walled carbon nanotube film on a wire mesh.

17. The process of claim 8, comprising layering multiple layers of the single-walled carbon nanotube film.

18. The supercapacitor of claim 1, wherein one or both of the first and the second single-walled carbon nanotube film electrodes are a product of the process of claim 8.

19. The supercapacitor of claim 9, wherein the supercapacitor has an efficiency of over 80% for over 200,000 charge-discharge cycles at 25 degrees and 100 degrees C. at current densities between 100 mA/g to 100 A/g.

20. A single-walled carbon nanotube film electrode produced by the process of claim 8.

* * * * *